United States Patent [19]

Negoro et al.

[11] Patent Number: 5,778,510
[45] Date of Patent: Jul. 14, 1998

[54] METHOD AND APPARATUS FOR ATTACHING OR DETACHING A FILMSTRIP TO A FILM CARTRIDGE

[75] Inventors: Hisashi Negoro; Takuya Yamamoto, both of Wakayama, Japan

[73] Assignee: Noritsu Koki Co., Ltd., Wakayama, Japan

[21] Appl. No.: 762,105

[22] Filed: Dec. 9, 1996

[30] Foreign Application Priority Data

Dec. 8, 1995 [JP] Japan .................... 7-320693

[51] Int. Cl.$^6$ .............. B23P 11/00; G03B 23/19; B65B 63/04
[52] U.S. Cl. .................. 29/434; 242/348.1; 53/118
[58] Field of Search .................. 29/434, 806; 141/396, 141/222; 53/430, 119, 389.2, 211; 242/348.1, 532.6, 532.7

[56] References Cited

U.S. PATENT DOCUMENTS

| | | | |
|---|---|---|---|
| 4,205,436 | 6/1980 | Klotz et al. | 29/783 |
| 4,860,423 | 8/1989 | Baynes | 29/434 |
| 5,303,464 | 4/1994 | Neff | 29/809 |
| 5,320,300 | 6/1994 | Gorman et al. | 242/348.1 |
| 5,439,186 | 8/1995 | Merle et al. | 242/348.1 |
| 5,450,704 | 9/1995 | Clostermeyer | 53/118 |
| 5,497,542 | 3/1996 | Sengstock | 29/434 |
| 5,499,436 | 3/1996 | Merle et al. | 29/270 |
| 5,520,348 | 5/1996 | Merle et al. | 242/348.1 |
| 5,573,196 | 11/1996 | Merle | 242/348.1 |
| 5,581,974 | 12/1996 | Underhill et al. | 53/118 |
| 5,632,452 | 5/1997 | Takahashi et al. | 242/348.1 |

*Primary Examiner*—David P. Bryant
*Assistant Examiner*—Tisa Stewart
*Attorney, Agent, or Firm*—Smith Patent Office; Randolph A. Smith

[57] ABSTRACT

A method and apparatus for attaching and detaching a filmstrip to a film cartridge having a take-up spool rotatably mounted therein. The cartridge has an access opening for allowing film to be inserted or removed from within. The apparatus includes means for positioning the film cartridge in a predetermined position. An attachment tool is rotatably mounted to the mechanism for movement about a pivot point. The attachment tool has a generally arcuate guide member. A mechanism is provided for moving the attachment tool from a non-engaged position to a first engaged position such that a portion of the attachment tool extends into the access opening for engaging the filmstrip to the attachment tool and for moving the tool to a second engaging position for allowing the filmstrip to engage the spool. The mechanism is further provided for moving the attachment tool in a radial direction while the attachment tool extends into the access opening.

9 Claims, 8 Drawing Sheets

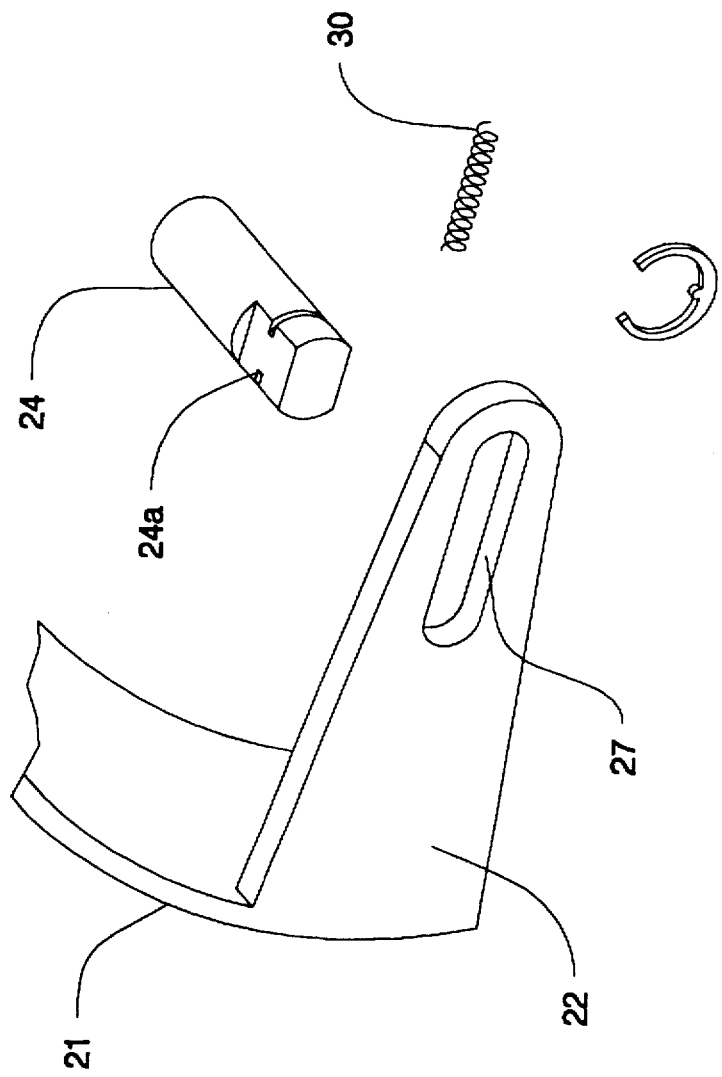

METHOD AND APPARATUS FOR ATTACHING OR DETACHING A FILMSTRIP TO A FILM CARTRIDGE

BACKGROUND OF THE INVENTION

1. Field of the Invention

The present invention relates to a method and apparatus for attaching or detaching a filmstrip to a film cartridge.

2. Description of the Related Art

Heretofore, techniques for allowing a developed filmstrip to be wound automatically into a vacant film cartridge have been known. As shown in FIG. 1, a film cartridge 101 is set at predetermined position in an automatic developing apparatus and a light door 102 of the film cartridge 101 is opened by a drive tool (not shown). Then an attachment tool 107 having an arcuate blade 106 is rotate toward an opening or slot 108 through which a filmstrip goes in and out. At that time, the arcuate blade 106 en ages the end of a filmstrip 105 and goes into the film cartridge 101 passing by the open light door 102. Subsequently the end of the filmstrip 105 is guided and engaged with a pair of projections 104 formed on a spool 103 to each the filmstrip.

In this case, the arcuate blade 106 is required to pass nearby to the open light door 102 in order to trace a curve (shown by a chain line). This curve shows the movement of the filmstrip 105 until it becomes engaged with the projections 104 on the spool 103. Therefore, the arcuate blade 106 may possibly touch the light door 102 when the arcuate blade 106 passes by the open light door 102.

In order to solve this problem, U.S. Pat. No. 5,499,436 proposed a solution. As shown in FIG. 2, a technique is proposed for allowing the film cartridge 101 to be moved from a position shown in FIG. 1 in order to provide a sufficient clearance 109 between the arcuate blade 106 and the light door 102 when the arcuate blade 106 passes by the open light door 102. When the arcuate blade 106 is rotated in this condition, however, the filmstrip 105 engaged with the arcuate blade 106 traces the curve (shown by a chain line in FIG. 2). This curve shows the movement of the filmstrip 105 such that it will not become engaged with the projections 104 on the spool 103. Therefore, just after the terminal end of the arcuate blade 106 passes by the open light door 102, the film cartridge 101 is moved up after having moved down. Consequently, the filmstrip 105 engaged with the arcuate blade 106 may trace the curve (using the same trace line as the chain line shown in FIG. 1) so that the end of the filmstrip 105 can be engaged with the projections 104 formed on the spool 103 to catch the filmstrip.

However, the down and then up movement of the film cartridge 101 of FIG. 2 mentioned above requires an intricate mechanism to carry out the down and then up movement. Furthermore, when the drive tool (not shown) of the light door 102 is moved together with the film cartridge 101 into an engaged condition, the mechanism of the drive tool requires a large modification. Alternatively, the film cartridge 101 may be moved up after being disengaged from the drive tool, but this results in a greater loss of time and a long operation time to wind the filmstrips into same number of film cartridges thereby resulting in low productivity. Furthermore, when plural film cartridges are arranged in a film cartridge holder and the filmstrip is wound into one of the film cartridges, a positioning mechanism for the film cartridge holder is required and the overall device becomes larger.

The problem mentioned above is a great barrier against the demand for miniaturizing the overall apparatus for merchandising.

SUMMARY OF THE INVENTION

An object of the present invention is to provide an insertion mechanism of an arcuate blade of an automatic developing apparatus that enables smooth winding of a filmstrip into a film cartridge.

Another object of the invention is to provide an insertion mechanism of an arcuate blade for an automatic developing apparatus that enables smooth winding of a filmstrip into a film cartridge which is arranged in a film cartridge holder with other film cartridges.

In order to achieve these objects, according to the present invention, there is provided a mechanism for attaching a filmstrip to a film cartridge having a take-up spool rotatably mounted therein. The cartridge having an access opening for allowing the filmstrip to be inserted or removed from within the cartridge. The mechanism comprises means for positioning the film cartridge in a predetermined position and an attachment tool rotatably mounted to the mechanism for movement about a pivot point with the attachment tool having a generally arcuate guide member. The mechanism also includes means for moving the attachment tool from a non-engaged position to a first engaged position such that a portion of the attachment tool extends into the access opening. The mechanism also includes means for engaging the filmstrip to the attachment tool, means for moving the attachment tool to a second engaged position for engaging the filmstrip to the take-up spool; and means for moving the attachment tool in a radial direction while the attachment tool extends into the access opening.

BRIEF DESCRIPTION OF THE DRAWINGS

The above and other objects and features of the present invention will be clearly understood from the following description with respect to a preferred embodiment thereof when considered in conjunction with the accompanying drawings, wherein the same reference numerals have been used to denote the same or similar parts or elements, and in which:

FIG. 12 is another embodiment of an arcuate blade intrusion system.

DETAILED DESCRIPTION OF THE PREFERRED EMBODIMENTS

Figure 1:
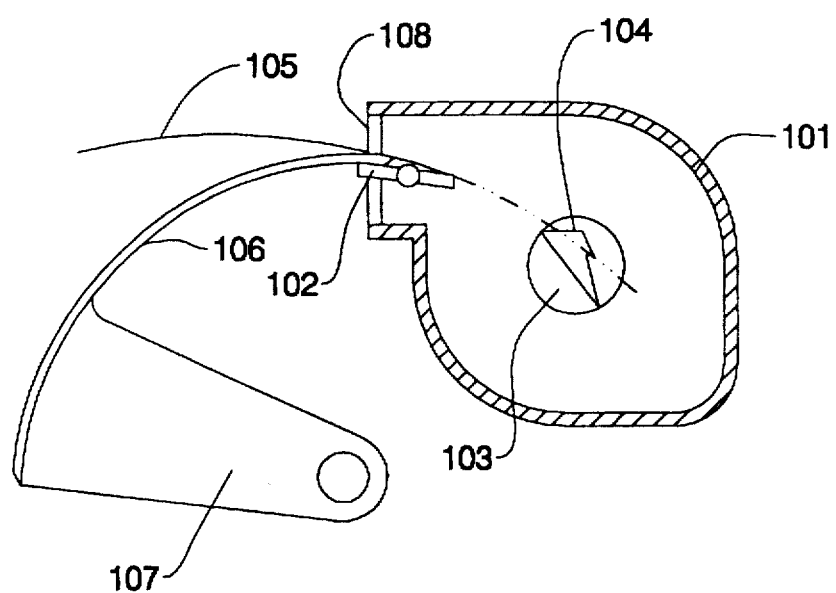
FIG. 1 is a simplified schematic side view of conventional arcuate blade intrusion system.
Figure 2:
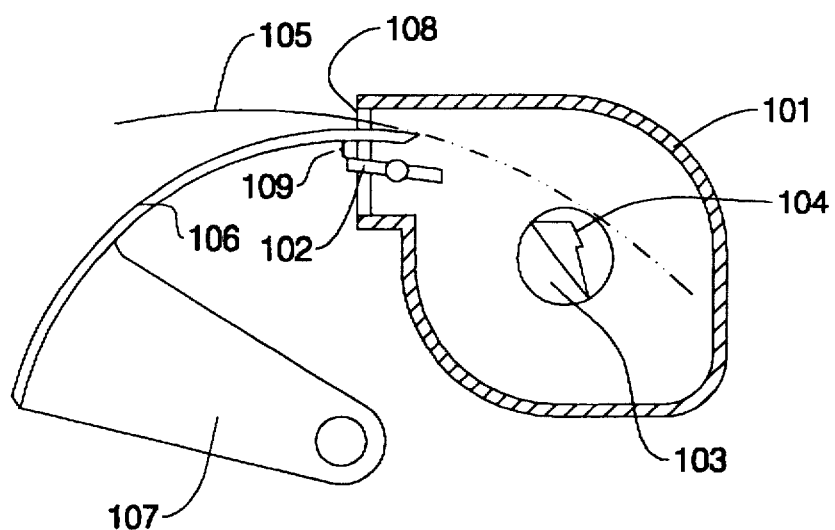
FIG. 2 is a simplified schematic side view of another arcuate blade intrusion system in operation.
Figure 3:
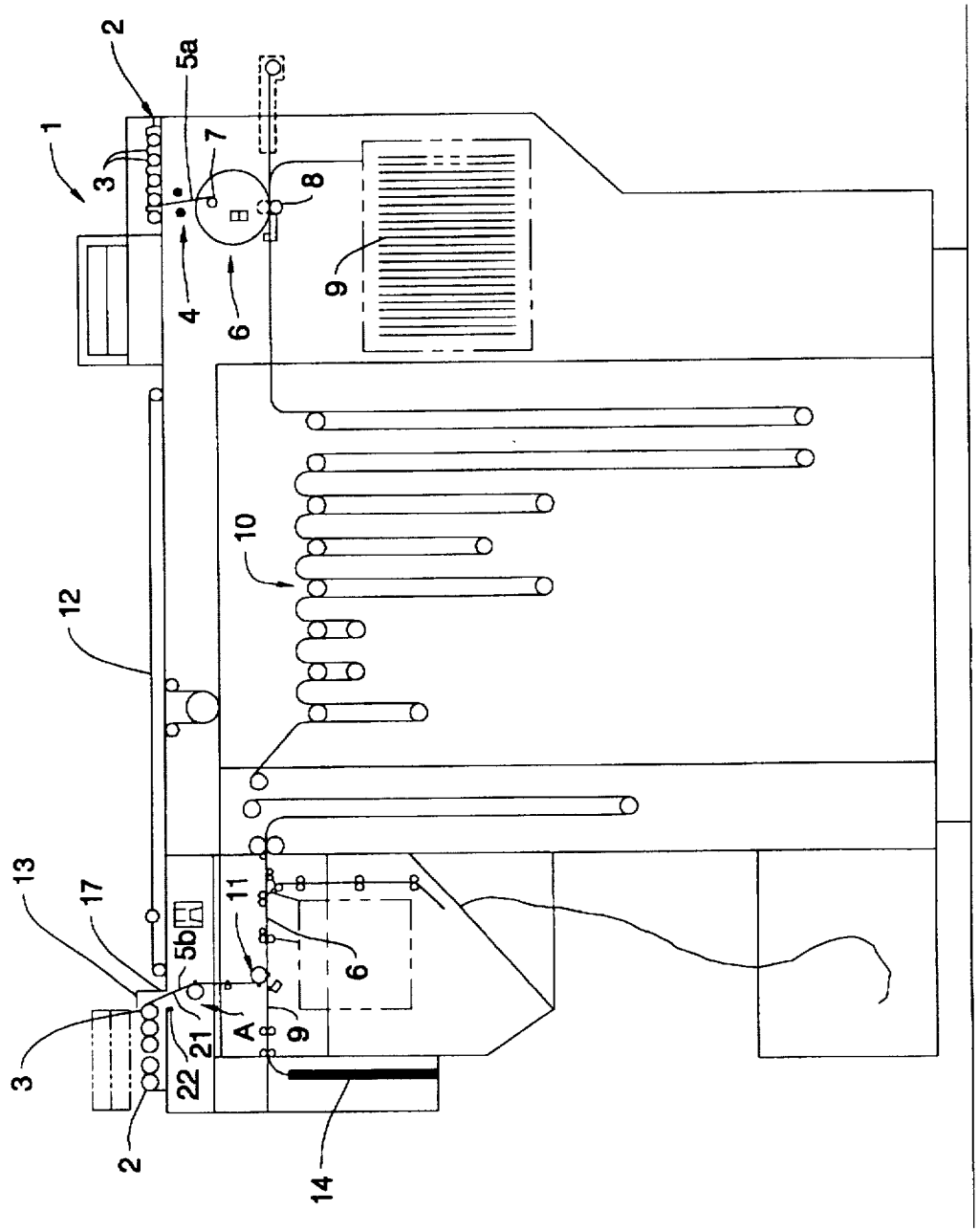
FIG. 3 is a simplified side view of an automatic developing apparatus according to the present invention.

The arcuate blade intrusion system of the present invention will now be described with reference to FIGS. 3–9. The disclosure of priority application JP 7-320693 is incorporated herein by reference. FIG. 3 is a simplified drawing of an automatic developing apparatus 1 equipped with an arcuate blade intrusion system A of the present invention. A film cartridge holder 2 in which plural film cartridges 3 are arranged with undeveloped filmstrips wound in them is disposed on the right side of the apparatus 1. An undeveloped filmstrip 5a is drawn out of a film cartridge 3 which is located in the film cartridge holder 2. The filmstrip 5a is drawn out at a withdrawing portion 4. The undeveloped film strips 5a drawn out of the film cartridge 3 are rewound into a rewinding film cartridge 7 at a rewinding portion 6.

To convey the end of the undeveloped filmstrips 5a, they are engaged and connected to a short leader 9 at a splice portion 8. The undeveloped filmstrip 5a engaged with the short leader 9 is developed at a developing portion 10. The developed filmstrip 5b is disengaged from the short leader 9 at a disengagement portion 11. The vacant film cartridge 3 from which the undeveloped filmstrip 5a was drawn out at the drawing out portion 4 is coveyed through a vacant film cartridge conveyor portion 12. The film cartridge holder 2 is held temporarily at a filmstrip winding portion 13 in order to wind the developed filmstrip 5b into the conveyed vacant film cartridges 3. A leader storage portion 14 is provided in order to store plural short leaders 9 disengaged from developed filmstrip 5b at the disengagement portion 11. The arcuate blade intrusion system A is provided under the film strip winding portion 13.

Figure 10:
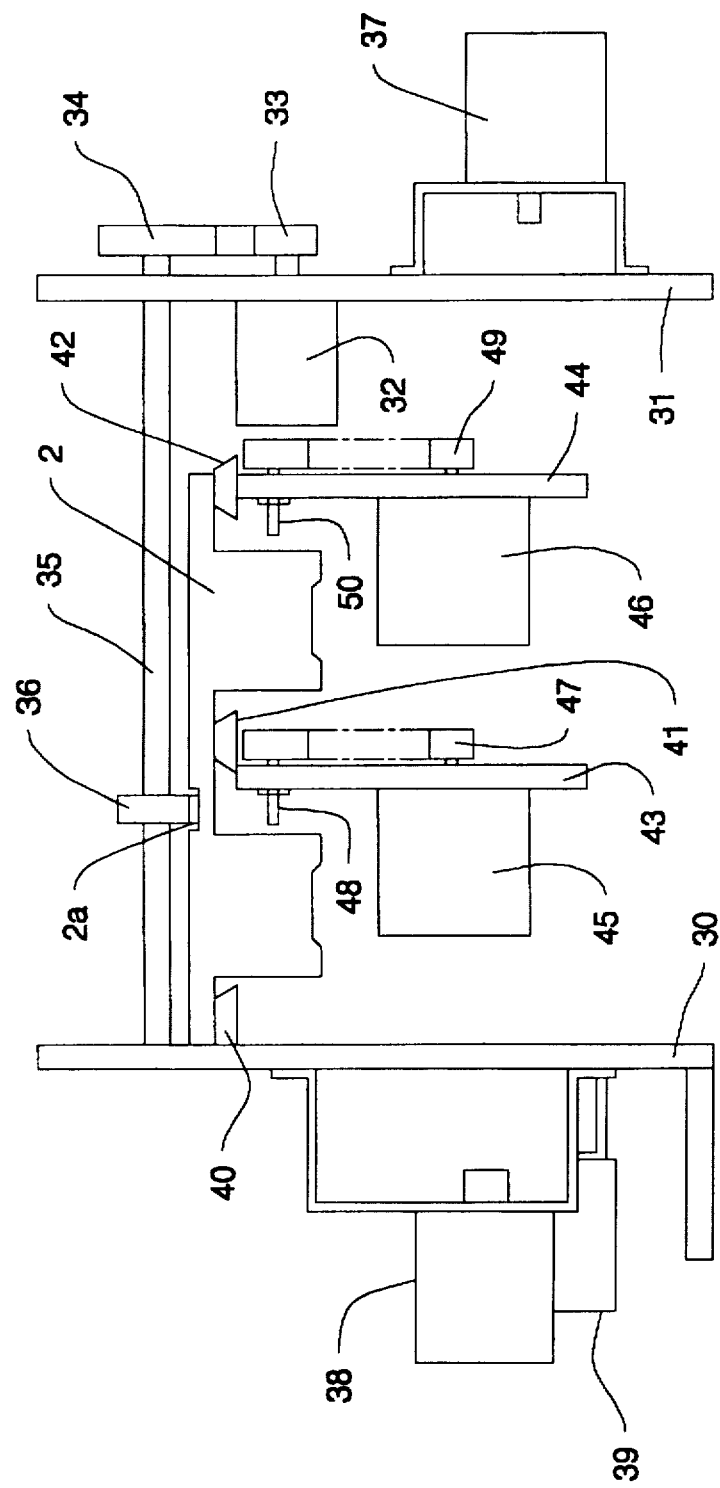
FIG. 10 is a schematic side view arrangement of the main components of the arcuate blade intrusion system.

FIG. 10 is schematic drawing of the main components of the arcuate blade intrusion system A including a conveyor device of the film cartridge holder 2.

On frame members 30 and 31, a conveyor motor 32 is installed to convey the film cartridge holder 2. A drive pulley 33 drives a driven pulley 34 fixed at the end of the drive shaft 35 through a drive belt that is fixed at the end of an output shaft of the conveyor motor 32. The drive shaft 35 is equipped with a pinion 36 which engages with a rack 2a formed on a top surface of the film cartridge holder 2 along its length. The film cartridge holder 2 is driven and conveyed in a direction perpendicular to the paper by the rotation of the pinion 36. Guide members 40, 41, 42 on which the film cartridge holder 2 is mounted are installed under the bottom surface of the film cartridge holder 2.

A drive motor 37 is provided to rotate a light door 18 and a drive motor 38 is provided to move shaft 19 back and forth. Further, a drive motor 39 is provided to move the drive shaft 24 of the attachment arm 22 so as to rotate the arm 22. The drive shafts are not shown in in detail in FIG. 10.

The frame member 43 and 44 are installed below the film cartridge holder 2. The frame member 43 and 44 are equipped with drive shafts 48 and 50 to drive the spool shafts 16 of the film cartridges 3 and the spool drive motors 45 and 46 are provided with pulleys 47 and 49 to drive the drive shafts 48 and 50 through the drive belts which are shown in phantom.

Figure 4:
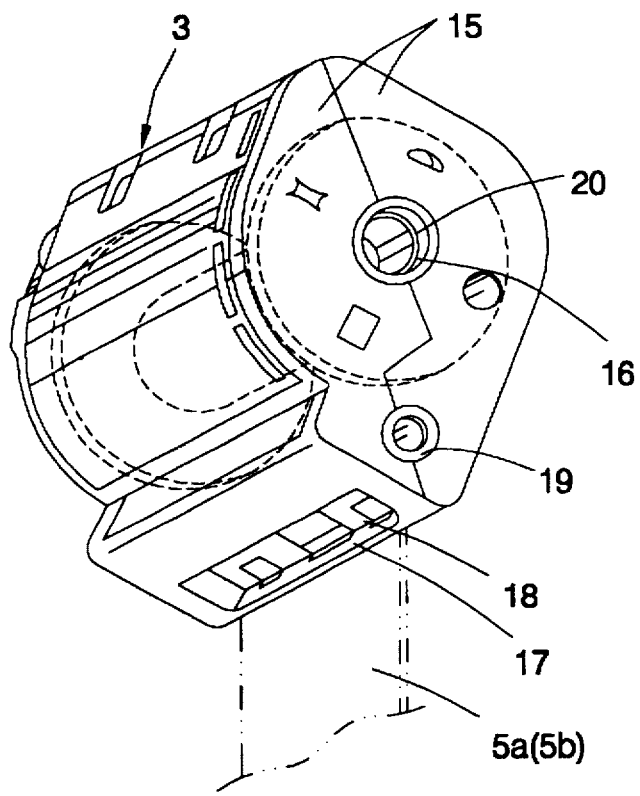
FIG. 4 is a perspective view of a film cartridge according to the present invention.

As shown in FIG. 4, the film cartridge 3 contains a spool 16 rotatably mounted on a shell which consists of two resin shell halves 15 and a light valve or door 18. The light door 18 is for shielding light and is installed in front of an opening or slot 17 on an outer wall of the shell 15 at the ingress and the egress of the filmstrip 5b. The light door 18 is operated between an open and a closed position through a support shaft (operating portion) 19 controlled by an exclusive drive motor (not shown in FIG. 4). When the light door 18 is operated to the open position, a shaft end (operating portion) 20 of the spool 16 located on a side wall of the shell 15 is rotated by a drive tool (not shown) to allow the filmstrip 5 to be released out of or wound into the film cartridge 3.

Figure 5:
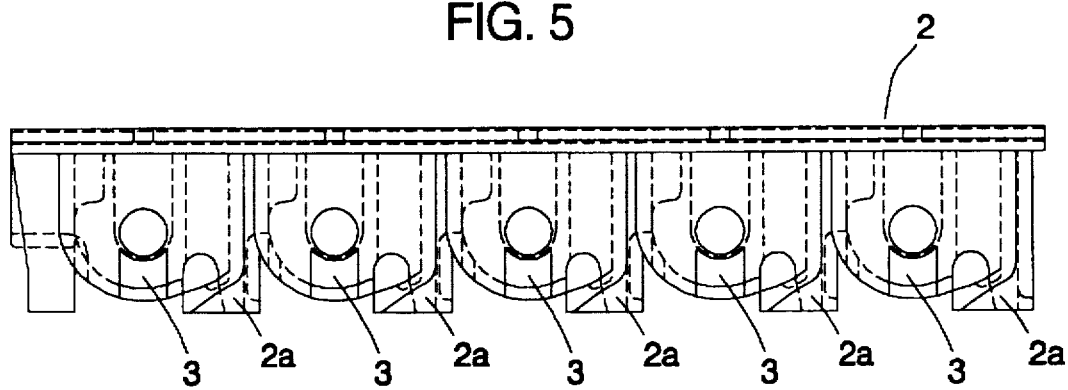
FIG. 5 is a side view of a film cartridge holder according to the present invention.

As shown in FIG. 5, the film cartridges 3 are arranged in the film cartridge holder 2 in lines having five film cartridges in each line (half of them are not shown in FIG. 5). An opening 2a is provided under each film cartridge held in the film cartridge holder 2 respectively. Through opening 2a, the undeveloped filmstrip goes out of and the developed filmstrip is wound into the film cartridge 3.

As described above, when the film cartridge holder 3 with vacant film cartridges comes to the filmstrip winding portion 13, the developed filmstrips 5b are successively wound into vacant film cartridges 3.

As shown in FIGS. 6–9, the arcuate blade intrusion system A comprises an attachment arm 22 having an arcuate blade 21 on its end surface 22a, a contact pin 23 which the attachment arm 22 contacts during rotation, a drive shaft 24 on which the attachment arm 22 rotates, and a drive device (not shown) for driving the drive shaft 24.

Figure 6:
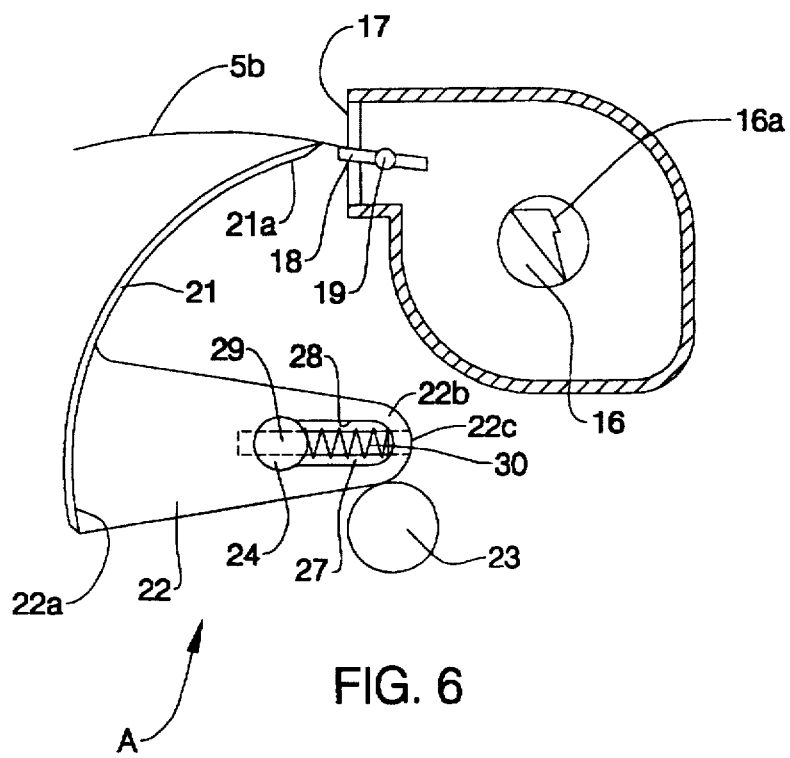
FIG. 6 is a simplified side view of an arcuate blade intrusion system of the present invention.
Figure 7:
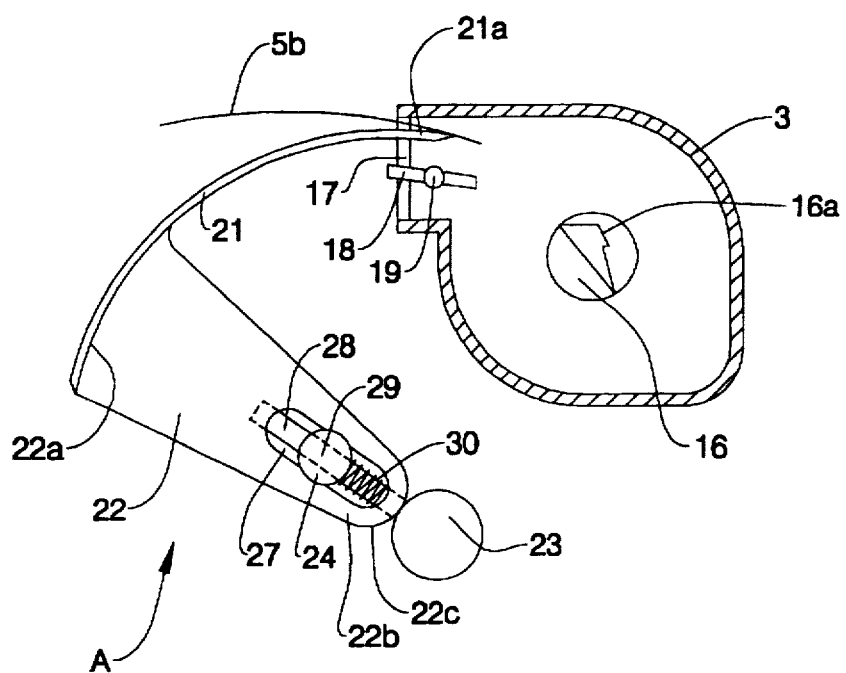
FIG. 7 is a simplified side view of an arcuate blade intrusion system of the present invention in operation.
Figure 8:
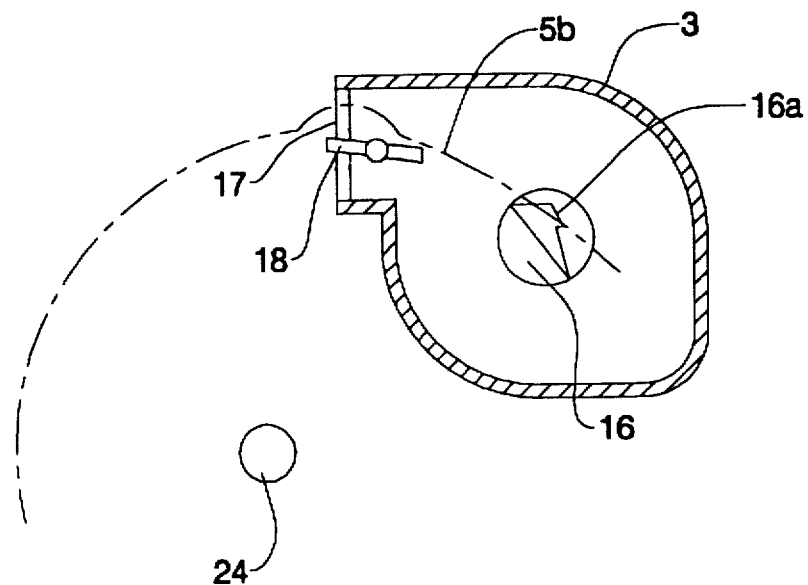
FIG. 8 is schematic view illustrating a trace line of an arcuate blade when introduced into a film cartridge.
Figure 9:
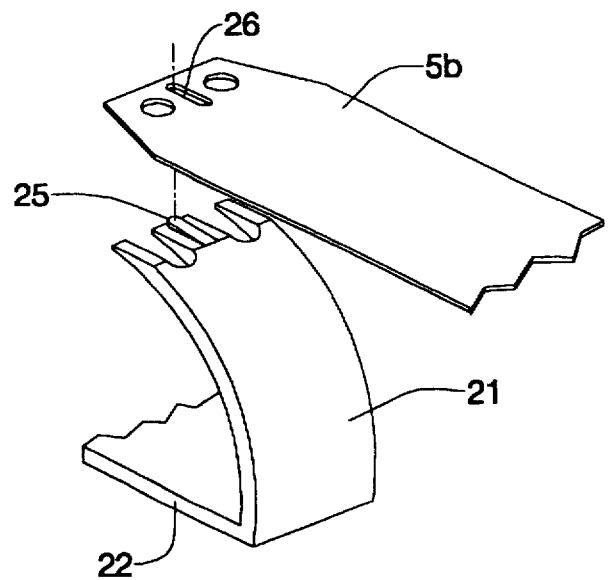
FIG. 9 is a perspective view illustrating the engaging relationship between a developed filmstrip and an arcuate blade.

As shown in FIG. 9, the arcuate blade 21 is made of thin metal formed to be arcuate and have a retaining finger 25 on its terminal end. The retaining finger 25 engages a drive opening 26 provided on the end of the developed filmstrip 5b. The arcuate blade 21 may be made of other materials than metal if there is no strength problem. As shown in FIG. 6, the end portion of the arcuate blade 21 mates with the end surface 22a of the attachment arm 22 which is also formed to be arcuate. An outer surface 22c of a pivot end portion 22b of the attachment arm 22 is formed to be semicircular. An approximately oval hole 27 is formed in the pivot end portion 22b. A support pin 28 is set on a side surface of the attachment arm 22 across the oval hole 27. Both ends of the support pin 28 are fixed on the attachment arm 22.

In the assembled condition, the support pin 28 penetrates the drive shaft 24 through a hole 29 formed in it. The attachment arm 22 can move in its longitudinal direction relative to the drive shaft 24 and can also rotate around the drive shaft 24. Furthermore, the support pin 28 is equipped with a spring 30 which continuously pushes the drive shaft 24 toward the arcuate blade 21 direction in the oval hole 27.

Under the filmstrip winding portion 13 (see FIG. 3), the contact pin 23 is provided. When the attachment arm 22 is rotated by the drive shaft 24, the outer surface 22c of the pivot end portion 22b of the attachment arm 22 contacts the contact pin 23. Subsequently, the attachment arm 22 is moved toward the arcuate blade 21 direction opposing the spring force of the spring 30.

The attachment arm 22 rotates toward the film cartridge 3 contacting the contact pin 23, so that a terminal end 21a of the arcuate blade 21 can pass by the open light door 18 and into the opening 17 following the trace line which allows the arcuate blade 21 to avoid contact with the light door 18.

As shown in FIG. 5, when the film cartridge holder 2 with plural vacant film cartridges 3 arranged therein is set in the filmstrip winding portion 13 (see FIG. 3), the opening 17 of each film cartridge 3 is arranged in the film cartridge holder 2 and faces downward. The film cartridge 3 in the first position of the film cartridge holder 2 is placed above the arcuate blade 21 of the arcuate blade intrusion system A which guides the developed filmstrip 5b into the film cartridge 3.

Under this condition, the light door 18 which covers the opening 17 is opened by the drive tool (not shown). At the same time, the attachment arm 22 is rotated by the drive shaft 24 driven by the drive device (not shown) toward the film cartridge 3. As the attachment arm 22 rotates, the outer surface 22c of the pivot end portion 22b of the attachment arm 22 contacts the contact pin 23.

As previously described, the attachment arm 22 is moved in an outer radius direction opposing the spring force of the spring 30. This movement of the attachment arm 22 occurs when the terminal end 21a of the arcuate blade 21 passes by the opening 17. When the terminal end 21a of the arcuate blade 21 passes by the light door 18, the attachment arm 22 is moved in a radially outward direction by the contact pin 23, so that the arcuate blade 21 can pass by the opening 17 smoothly and prevent it from touching the light door 18. Then the arcuate blade 21 moves on the original arcuate trace line and guides the engaged developed filmstrip 5b to a pair of projections 16a formed on a spool 16 to catch the filmstrip so that the trailing end of the developed filmstrip 5b can be set on the projections 16a.

The reason why the arcuate blade 21 moves on the original trace line, the same curve as drawn prior to being inserted into the film cartridge, after having passed by the open light door 18, is as follows. A contacting condition of the outer surface 22c of the pivot end portion 22b of the attachment arm 22 with the contact pin 23 is released (as shown in FIG. 6), and consequently the attachment arm 21 is restored to its original position by the spring force of the spring 30. The developed filmstrip 5b set on the projection 16a on the spool 16 of the film cartridge 3 is wound around the spool 16 driven by a drive motor (not shown) that is connected to the spool 16. As previously described, prior to the winding motion of the developed filmstrip 5b, the arcuate blade 21 that has been inserted into the film cartridge 3 is taken out of the film cartridge 3 and returned to its original position by reverse rotation of the attachment arm 22 driven by the drive shaft 24. In the reverse rotation, the attachment arm 22 contacts again the contact pin 23 and consequently moves on the trace line which prevents it from touching the light door 18 while passing by the light door 18.

Figure 11:
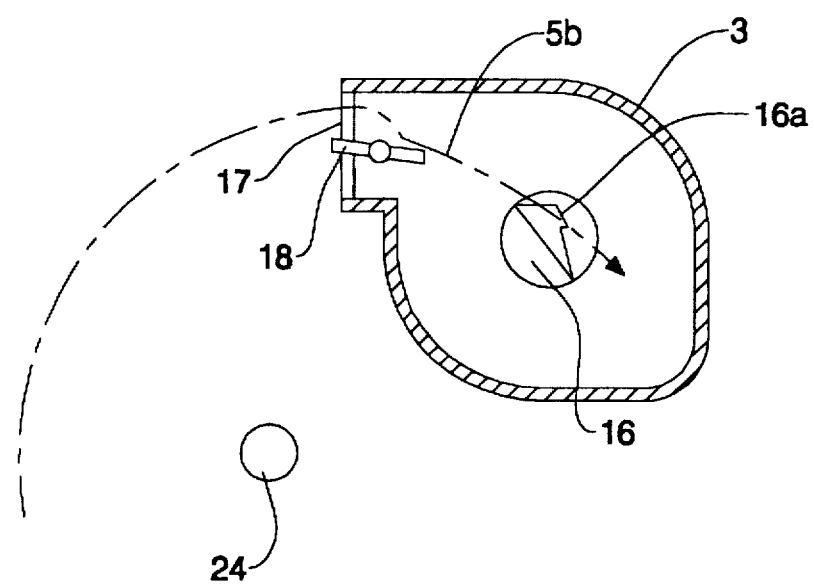
FIG. 11 is another embodiment of a trace line of an arcuate blade when it has intruded into a film cartridge according to the present invention.

FIG. 11 shows another embodiment of the trace line of the terminal end 21a of the arcuate blade 21. In this embodiment, the terminal end 21a of the arcuate blade 21 is rotated toward the film cartridge 3 with a radially pushed out position when it is out of the light door 18, that is, out of the cartridge 3, while, in FIG. 8, the terminal end 21a of the arcuate blade 21 traces the deformed curve outside near the light door 18.

FIG. 12 shows another embodiment of the arcuate blade intrusion system A. A pair of opposite flat portions 24a are formed at the end of the drive shaft 24 and a drive torque is transmitted through the flat portion 24a. The drive shaft 24 is connected to the attachment arm 22 by a snap ring 24b so as not to be disconnected. A spring 30 is appropriately installed between the drive shaft 24 and the approximate oval shaped opening 27.

Due to the action of the arcuate blade intrusion system A, as described above, the undeveloped filmstrip 5a (see FIG. 3) is drawn out of the film cartridge 3, engaged to the short leader 9, conveyed, and then developed at the developing portion 10. After the film is developed, the short leader 9 is disengaged from the developed filmstrip 5b. The film cartridge holder 2 in which the original vacant film cartridges were arranged is conveyed through the vacant film cartridge conveyor portion 12 and placed in the filmstrip winding portion 13 located above the arcuate blade intrusion system A. Each developed filmstrip 5b is wound and stored into a corresponding original vacant film cartridge 3 respectively by the arcuate blade intrusion system A. Once the first filmstrip is stored into the first film cartridge 3, the film cartridge holder 2 is moved down a step and the second developed filmstrip 5b is stored into the next film cartridge 3. When all the film cartridges 3 in the film cartridge holder 2 are filled with developed filmstrips 5b, the films cartridge holder 2 is conveyed to the next printing station.

Although the arcuate blade intrusion system A mentioned above is installed in the attacher which works to store the developed filmstrip 5b into the film cartridge 3, it can be installed as well in the detacher which works to disengage the undeveloped filmstrip 5a from the cartridge 3.

Thus there is provided an attachment/detachment apparatus and method which is simple in construction and allows the filmstrip to go through the opening of the film cartridge moving along the trace line which prevents it from touching the open light door, and enables a smooth storage operation of the developed filmstrip into the film cartridge without loss of operational efficiency.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A mechanism for attaching a filmstrip to a film cartridge having a take-up spool rotatably mounted therein, said cartridge having an access opening for allowing the filmstrip to be inserted or removed from within the cartridge, said mechanism comprising:
   a) means for positioning the film cartridge in a predetermined position;
   b) an attachment tool rotatably mounted to said mechanism for movement about a pivot point, said attachment tool having a generally arcuate guide member;
   c) means for moving said attachment tool from a non-engaged position to a first engaged position such that a portion of the attachment tool extends into said access opening;
   d) means for engaging the filmstrip to said attachment tool;
   e) means for moving said attachment tool to a second engaged position for engaging the filmstrip to said take-up spool; and
   f) means for moving said attachment tool in a radial direction relative to said pivot point while said attachment tool extends into said access opening.

2. A mechanism according to claim 1, wherein said attachment tool comprises a mounting section having an opening provided in a lower end, and an arcuate blade having a terminal end.

3. A mechanism according to claim 2, wherein said means for moving said attachment tool in a radial direction comprises the opening and a drive shaft rotating said mounting section so as to permit relative displacement of said mounting section and said drive shaft in the opening.

4. A mechanism according to claim 3, further comprising shifting means for contacting said mounting section and shifting said mounting section in a radially outward direction relative to said pivot point.

5. A mechanism according to claim 3, wherein the opening has an approximately oval configuration.

6. A mechanism according to claim 3, further comprising biasing means for biasing said mounting section to a radially inward direction relative to said pivot point.

7. A mechanism according to claim 4, wherein said shifting means is fixed below said driving shaft.

8. A mechanism according to claim 1, further comprising a film cartridge storage means for storing a plurality of film cartridges.

9. A mechanism according to claim 8, further comprising a transporting means for transporting said film cartridge storage means a predetermined distance sequentially for positioning said film cartridges in a predetermined position.

* * * * *